3,002,866
INKING ROLL

Robert D. Gartrell, Ridgewood, and Robert A. Gregg, Passaic, N.J., and Richard J. Farrell, Naugatuck, Conn., assignors to United States Rubber Company, New York, N.Y., a corporation of New Jersey
No Drawing. Filed May 15, 1956, Ser. No. 584,875
4 Claims. (Cl. 154—43)

This invention relates to improved inking rolls and more particularly to inking rolls of which at least the face or working surface comprises polyurethane material derived from isocyanate-modified polyester.

An object of our invention is to provide a cast inking roll having its working surface composed of a soft, elastomeric, non-porous polyurethane polymer characterized by a Shore "A" hardness in the range of from 5 to 35, and having a useful life several times longer than that of previous inking rolls.

Another object of our invention is to provide inking rolls which will exhibit a high resistance to swelling when used in contact with hydrocarbon printing ink vehicles.

Another object of our invention is to provide an inking roller which is inherently soft, which contains no gums, oils, plasticizers, etc., that are extractable by hydrocarbon ink solvents, and which therefore remains unchanging in hardness, strength and other physical characteristics during operation.

Inking rolls are used in direct-printing presses for distributing ink from the ink fountain to the printing form or type surface (plate or cylinder), which in turn imprints the ink upon the paper or other surface, as in newspaper, letter, and magazine printing, and for distributing ink to the etched metal plate in offset printing and to the recessed plates used in intaglio or gravure printing.

For many years the majority of inking rolls were surfaced with gelled compositions of glue and glycerine, as such compositions were found by experience to be soft enough, and to be relatively inexpensive to make. Their maintenance, however, was notoriously bothersome, as they had only a very short life and had to be re-cast or re-surfaced very frequently, because of their tendency to change in hardness, crack, and eventually disintegrate during use. Inking rolls of synthetic rubber have almost entirely supplanted glue-glycerine rolls in modern high-speed presses, where the rolls must operate at temperatures at which glue-glycerine rolls fail. Even the best synthetic rubber rolls have the disadvantage that they swell unduly in hydrocarbon ink solvents, and they must be re-ground at intervals of three to six months.

Another serious failing of prior inking rolls made by incorporating plasticizers in various elastomers is that the plasticizer invariably disappears in time, being lost by evaporation and/or extraction by the ink solvents, resulting in shrinkage and hardening of the rolls and caking of ink.

The prime purpose of our invention is to overcome the above-mentioned disadvantages of prior inking rolls. At the same time, we desired a tough, resilient, and wear-resistant roll of comparatively low hardness (5–35 on the Shore A durometer scale) which will permit good impressions even from slightly uneven type or plates. Harder rolls would not accommodate themselves to even minor irregularities.

Seeger, U.S. Patent 2,625,532, discloses covered rolls made from the products of interaction of a linear polyester (from a dicarboxylic acid and a glycol), a monocyclic arylene diisocyanate, another bifunctional additive having at least one amino or carboxyl group, and an additional amount of diisocyanate. The drawback of such material is the comparatively high hardness, outside the useful range for inking rolls. Such hardness would result in poor printing characteristics.

We have discovered that inking rolls that are covered with a soft elastomeric, non-porous polyurethane having a Shore "A" indentation hardness in the range from 5 to 35 give greatly improved performance over the rolls of the prior art. Our new rolls have been found to carry 25% more ink than ordinary rolls; they give sharp, clear impressions, and do not harden over long periods of time and use.

The new inking rolls are made from a pourable liquid mixture of polyester and polyisocyanate whose ingredients may have partially interacted, and which has the inherent property of setting to the soft elastomeric condition without release of any gaseous substance which would cause the cured product to be porous. Our rolls are therefore curable without the application of any confining pressure.

Compositions suitable for the manufacture of these rolls may consist of a mixture of an alkyd-type polyester and an organic polyisocyanate, in roughly stoichiometric proportions, the polyester usually being in slight excess. Either the polyester or the polyisocyanate should have an average number of reactive groups greater than 2.0 in order to provide a moderate degree of branching. For example, we may use a mixture of a moderately branched polyester (necessarily having more than two isocyanate-reactive terminal groups) and a diisocyanate. With polyesters having an average of about 3 terminal hydroxyls per molecule, we use from 0.7 to 1.0 or more isocyanate equivalent per hydroxyl equivalent. For example, in the case of a polyester averaging 2.7 hydroxyls per molecule, we can use as little as 0.7 isocyanate equivalent per hydroxyl equivalent. Polyesters having more branching, such as those averaging 4 hydroxyls per molecule, require an even lower proportion of isocyanate to achieve the desired softness in the inking rolls. In all cases, the lower the proportion of diisocyanate that is employed, the softer is the cured roll. Conversely, isocyanate-to-hydroxyl ratios above 1.0 are not often used since they generally lead to rolls of undue hardness.

As is well known, a moderately branched polyester having more than two isocyanate-reactive end groups may be made by including a small amount of either a trihydric (or higher) alcohol or a tribasic (or higher) carboxylic acid in an esterification reaction mix which consists predominantly of a glycol and a dioic acid. For example, the esterifying alcohols may consist of a mixture of a diol and a triol, the diol preponderating, and the amount of triol being on the order of, say, 5–10 mole-percent of the mixture of alcohols.

Suitable diols for our purposes include ethylene glycol, propylene glycol, 1,3-propane diol, 1,4-butane-diol, diethylene glycol, dipropylene glycol, etc.

Suitable triols are especially those containing three primary alcohol groups such as trimethylol methane, trimethylol ethane, and trimethylol propane. A tetrol such as pentaerythritol may likewise be used.

Typical of the dicarboxylic acids used in forming the polyesters are those aliphatic acids having 4–10 carbon atoms, e.g., succinic acid, glutaric acid, adipic acid, pimelic acid, suberic acid, azelaic acid, and sebacic acid. The use of dioic acids higher than sebacic is undesirable in our invention since the resulting polyesters may be too susceptible to swelling by kerosene, a solvent widely used in printers' inks. Typical of tribasic acids which may be used, if desired, in making branched polyesters are tricarballylic acid, citric acid, and aconitic acid.

The polyesters are made in the well-known manner by long heating together of the selected polycarboxylic acid and polyhydric alcohols. Whereas alkyds made from bifunctional ingredients only are unbranched linear polymers, the alkyds which we use, being made from a mixture of a diol and a higher polyol, such as a triol, consist of long chains having occasional branches immediate of the ends. While it must be recognized that polyesters varying widely in molecular weight can be used, a good balance of viscosity and isocyanate content of the pouring mix is obtained with polyesters having molecular weights of about 1500 to about 3000 and equivalent weights of about 500 to about 1200.

In accordance with practice known to those skilled in the art, the polyesters which we use in our invention are dry, and free of strong acids which would induce aging of the inking rolls.

The diisocyanates which may be employed in the reaction with the polyester are those which melt below 150° C.—preferably below 130° C. when the diisocyanate is to be added to polyester or polyester-isocyanate to give the final casting composition. It is advantageous to get a homogeneous mixture quickly without going to excessively high temperatures which may lead to decomposition and blowing in the rolls. Such diisocyanates include ethylene diisocyanates, phenylene diisocyanates, toluene diisocyanates, etc. Numerous additional operable diisocyanates are described by Siefken in Annalen der Chemie, vol. 562, pp. 75–136 (1949), this disclosure being incorporated herein by reference. Siefken's tables, pages 121–135, list such diisocyanates.

Both the polyester and the diisocyanate must be dry in order to insure bubble-free castings. Since the polyester is hygroscopic, it must be thoroughly dried before use. The drying may be conveniently carried out by heating the polyester resin to about 120° C. under a vacuum of 20–22 inches of mercury, and agitating during this period by introducing a stream of inert gas, such as carbon dioxide.

In order to obtain non-porous, bubble-free castings without the use of confining pressures, we carry out the curing step at temperatures below 150° C.

Specific illustrations of the preparation of the polyester and the isocyanate-polyester reaction product, and of the casting of the inking roll, are given below.

(1) *Preparation of polyester*

Charge:                                              Moles
  Adipic acid _____ 1.0
  Diethylene glycol _____ 1.1–2.5
  Trimethylol methane _____ 0.085

The above materials are charged to a reactor equipped with stirrer, inert gas inlet below surface of the liquid, heated distillation column with vacuum take-off and reactor thermometer. The system is flushed with inert gas and heat is applied. Water (2 moles) is distilled off until an acid number of less than 5 is obtained. Vacuum is then applied and excess diethylene glycol is distilled off until a product of desired molecular weight is obtained. The reactor temperature should not be allowed to go above 230° C.

(2) *Preparation of polyester*

A mixture of 27 moles of adipic acid, 28 moles of diethylene glycol, and 2 moles of 1,1,1-trimethylol ethane, plus 0.25% by weight of p-toluene sulfonic acid (based on the reaction mix) as catalyst, was heated for 18 hours under nitrogen gas, at temperatures of 180°–200° C., water vapor being removed as formed. At the end of reaction, vacuum was applied to strip out any water remaining. The polyester thus obtained has a viscosity of 15000 cp. (25° C.), an acid number less than 2, a hydroxyl number of 60, a molecular weight of about 2480, and an equivalent weight of 920.

Before subjecting the above polyester to further drying, 0.5% by weight of a volatile amine (triethylamine, for example) is added to neutralize any residual esterification catalyst. Any excess amine is subsequently boiled off during drying.

(3) *Preparation of diisocyanate-modified polyester*

To 950 parts of the polyester made as above described (section 2) and vacuum-dried and preheated to 125° C. (to reduce its viscosity), was added 86 parts of a 65/35 mixture of 2,4- and 2,6-tolylene diisocyanates, with constant stirring. The mixing may be carried out in an open-top glass or stainless steel vessel. After about 2.5 minutes of mixing, the reaction is already under way so that it is necessary that the mix be used promptly.

(4) *Mold preparation*

A steel mold was used. It consisted of a 2-inch steel pipe 24 inches long and screw-capped at one end. The pipe interior was highly polished. Since the cured polyester-isocyanate reaction product was known to adhere to most materials, a release agent was used. The most satisfactory release agent was a polymeric silicone composition, specifically a dimethyl polysiloxane fluid. The release agent is applied by simply wiping it on the mold surface.

(5) *Casting of the reaction product to form the inking roll*

The syrupy, partially reacted mixture made as above was poured immediately into the pipe mold equipped with a centered steel core or shaft, the assembly having been preheated to 121° C. and coated with silicone mold-release agent. The mixture in the mold was then cured by holding the filled mold at a temperature of about 110° C. for two hours. Release of the finished roll is effected by exerting hand pressure on the roll end. The resulting roll was smooth and the finish as cast was quite suitable for quality printing.

Another inking roll was made as follows:

One hundred parts of polyester prepared as in Reaction 2 above were preheated to 125° C., then 8.25 parts of a mixture of approximately 70% 2,4- and 30% 2,6-tolylene diisocyanates was added, and the mixture stirred for about 3 minutes. The mix was then poured into a prepared mold, as above, and cured for 4 hours at 250° F. The resultant ink roll exhibited an excellent surface finish and had a Shore "A" hardness of 25–30.

Inking rolls made according to our invention have been found to be vastly superior to those known to the prior art. They exhibit great toughness and structural stability, in either dry or humid air, at room temperatures, and at temperatures as high as 150° F. and as low as 0° F. They are capable of carrying up to as much as 25% more ink than ordinary rolls. They are non-porous, and give clear, sharp impressions; as no plasticizer is employed in their preparation, they do not harden even after operation for prolonged periods.

Having thus described our invention, what we claim and desire to protect by Letters Patent is:

1. The method of making a non-porous inking roll having a Shore "A" value of from 5 to 35 comprising pouring into a cylindrical mold containing a centrally disposed rod, a liquid mixture sufficient to completely cover said rod, said mixture comprising an alkyd polyester having an average number of reactive alcoholic hydroxyl groups greater than 2.0 per molecule, said alkyd polyester being prepared from an esterification reaction mix containing predominantly a dihydric alcohol and a dicarboxylic acid in admixture with a lesser quantity of a polyfunctional compound selected from the group consisting of a polyhydric alcohol having more than two reactive —OH groups and a polycarboxylic acid having more than two

groups, and an organic diisocyanate having a melting point below 150° C., the ratio of isocyanate to hydroxyl groups not exceeding 1.0, the molecular weight of said polyester being from 1500 to 3,000 and the equivalent weight being from 500 to 1200, and heating said polyester and diisocyanate at a temperature not exceeding 150° C., thereby causing said polyester and diisocyanate to react to form a cross-linked non-porous polyurethane inking roll, said method being carried out in the absence of any plasticizer for the polyurethane.

2. The method of making a non-porous inking roll having a Shore "A" value of from 5 to 35 comprising pouring into a cylindrical mold containing a centrally disposed rod, a liquid mixture sufficient to completely cover said rod, said mixture comprising a linear alkyd polyester having an average number of reactive alcoholic hydroxyl groups equal to approximately 2.0 per molecule, said alkyd polyester being prepared from an esterification reaction mix of a dihydric alcohol and a dicarboxylic acid, and an organic polyisocyanate having an average number of reactive —N=C=O groups greater than 2.0 per molecule, the ratio of isocyanate to hydroxyl groups not exceeding 1.0, the molecular weight of said polyester being from 1500 to 3,000 and the equivalent weight being from 500 to 1200, and heating said polyester and polyisocyanate at a temperature not exceeding 150° C., thereby causing said polyester and polyisocyanate to react to form a cross-linked non-porous polyurethane inking roll, said method being carried out in the absence of any plasticizer for the polyurethane.

3. An inking roll covered with a layer of non-porous polyurethane material comprised of the reaction product of an alkyd polyester having an average number of reactive alcoholic hydroxyl groups greater than 2.0 per molecule, said alkyd polyester being prepared from an esterification reaction mix containing predominantly a dihydric alcohol and a dicarboxylic acid in admixture with a lesser quantity of a polyfunctional compound selected from the group consisting of a polyhydric alcohol having more than two reactive —OH groups and a polycarboxylic acid having more than two

groups, with an organic diisocyanate having a melting point below 150° C., the ratio of isocyanate to hydroxyl groups not exceeding 1.0, said polyurethane material having a Shore "A" value of from 5 to 35 and being free from plasticizer for the polyurethane.

4. An inking roll covered with a layer of non-porous polyurethane material comprised of the reaction product of a linear alkyd polyester having an average number of reactive alcoholic hydroxyl groups equal to approximately 2.0 per molecule, said alkyd polyester being prepared from an esterification reaction mix of a dihydric alcohol and a dicarboxylic acid, with an organic polyisocyanate having an average number of reactive —N=C=O groups greater than 2.0 per molecule, the ratio of isocyanate to hydroxyl groups not exceeding 1.0, said polyurethane material having a Shore "A" value of from 5 to 35 and being free from plasticizer for the polyurethane.

References Cited in the file of this patent

UNITED STATES PATENTS

| | | |
|---|---|---|
| 2,350,421 | Schoder et al. | June 6, 1944 |
| 2,454,678 | Smith | Nov. 23, 1948 |
| 2,577,279 | Simon et al. | Dec. 4, 1951 |
| 2,625,532 | Seeger | Jan. 13, 1953 |
| 2,625,535 | Mastin | Jan. 13, 1953 |
| 2,698,838 | Simon et al. | Jan. 4, 1955 |

FOREIGN PATENTS

| | | |
|---|---|---|
| 1,087,016 | France | Aug. 18, 1954 |
| 749,541 | Great Britain | May 30, 1956 |

OTHER REFERENCES

"Polyurethanes," by O. Bayer, C.I.O.S. Report No. XXIX–12, translated February 28, 1946, pages 14, 15 and 20.

Allsebrook: "Isocyanates in Surface Coatings," Paint Manufacture, December 1955, pages 459–461 and 469.